United States Patent [19]

Elser et al.

[11] 4,317,149
[45] Feb. 23, 1982

[54] MAGNETIC HEAD HAVING STATIC DISCHARGE MEANS

[75] Inventors: Karl H. Elser; Russell R. Kerl, both of San Jose, Calif.

[73] Assignee: International Business Machines Corporation, Armonk, N.Y.

[21] Appl. No.: 155,348

[22] Filed: Jun. 2, 1980

[51] Int. Cl.³ .......................... G11B 5/16; G11B 5/25; G11B 21/24
[52] U.S. Cl. .................................. 360/126; 360/110; 360/119
[58] Field of Search ............... 360/126, 110, 119, 123, 360/124, 125, 127, 128, 115, 117; 29/603; 324/43; 235/449, 450

[56] References Cited

U.S. PATENT DOCUMENTS

| | | | |
|---|---|---|---|
| 3,813,693 | 5/1974 | Gooch | 360/119 |
| 3,975,773 | 8/1976 | Dejovhanet | 360/126 |
| 4,149,205 | 4/1979 | Berghoff | 360/126 |
| 4,152,741 | 5/1979 | Mizuno et al. | 360/119 |

OTHER PUBLICATIONS

IBM Technical Disclosure Bulletin, vol. 17, No. 9, Feb. 1975, p. 2549.

Primary Examiner—Robert M. Kilgore
Attorney, Agent, or Firm—Nathan N. Kallman

[57] ABSTRACT

A magnetic head assembly has conductive strips that serve as bypass paths to discharge static electrical charges at a distance from the effective magnetic pole pieces and transducing gap.

6 Claims, 4 Drawing Figures

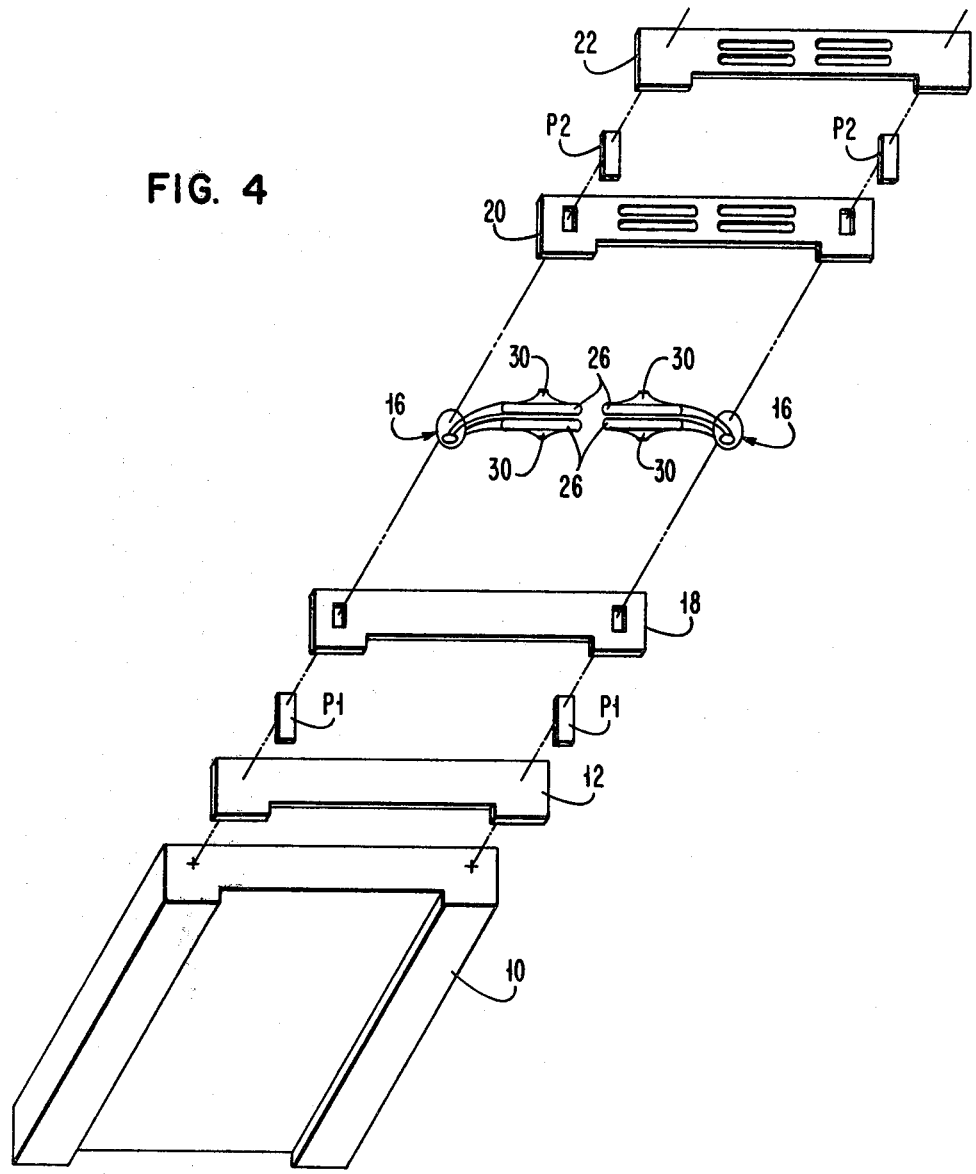

MAGNETIC HEAD HAVING STATIC DISCHARGE MEANS

DESCRIPTION

1. Technical Field

This invention relates to a magnetic head assembly and in particular to a head slider incorporating static electricity discharge paths.

An object of this invention is to provide a magnetic head assembly that is resistant to static discharge damage.

Another object of this invention is to provide a magnetic head assembly that neutralizes unbalanced electrical charges.

Another object is to provide a magnetic head assembly that provides relatively short conductive discharge paths which bypass critical pole piece elements.

2. Background Art

A major problem that is found during the manufacture of magnetic recording heads, particularly of the thin film type, is the spurious discharge of static electricity which has been undesirably generated. Static charges may be produced by the presence of certain materials, such as plastics, which are present in the surroundings at the place of manufacture of the magnetic heads. When there is a static discharge, between a magnetic pole piece and an adjacent conductive layer, the pole piece may be damaged, particularly at a critical sensing portion, such as at the tip of the pole piece which is exposed and disposed adjacent to the transducing gap facing the record medium.

In addition, the dielectric or insulating material that surrounds the magnetic head coil would break down from the discharge effect. As a result, the head assembly is subject to deterioration and degradation so that it is rendered virtually useless.

Present approaches to alleviate this problem involves the grounding of operators, table tops, or the use of ion producing fans and air hose nozzle application, by way of example. Also, the materials used for storage containers and work trays must be carefully selected. However, the basic problem of spurious discharge at the critical pole tip area is not completely solved by these approaches.

SUMMARY OF THE INVENTION

In a magnetic head assembly, relatively short discharge bypass paths are provided to conduct spurious static electrical charge away from the pole pieces at critical areas of the magnetic transducer, such as the transducing gap and air bearing surface. The paths are formed from conductive material deposited in the recesses of an insulating layer which serves as a protective cover for at least one magnetic transducer that is deposited on a grounded conductive slider support. In this way, discharge gaps are formed between the conductive bypass paths and the conductive slider support, so that the static electric discharge will occur in areas displaced from the critical gap area at the air bearing surface.

BRIEF DESCRIPTION OF THE DRAWINGS

The invention will be described in greater detail with reference to the drawing in which:

FIG. 4 is an exploded view to delineate the elements incorporated in the head slider assembly of FIG. 2.

Similar numerals refer to similar elements throughout the drawing.

DESCRIPTION OF THE PREFERRED EMBODIMENT

Figure 1:
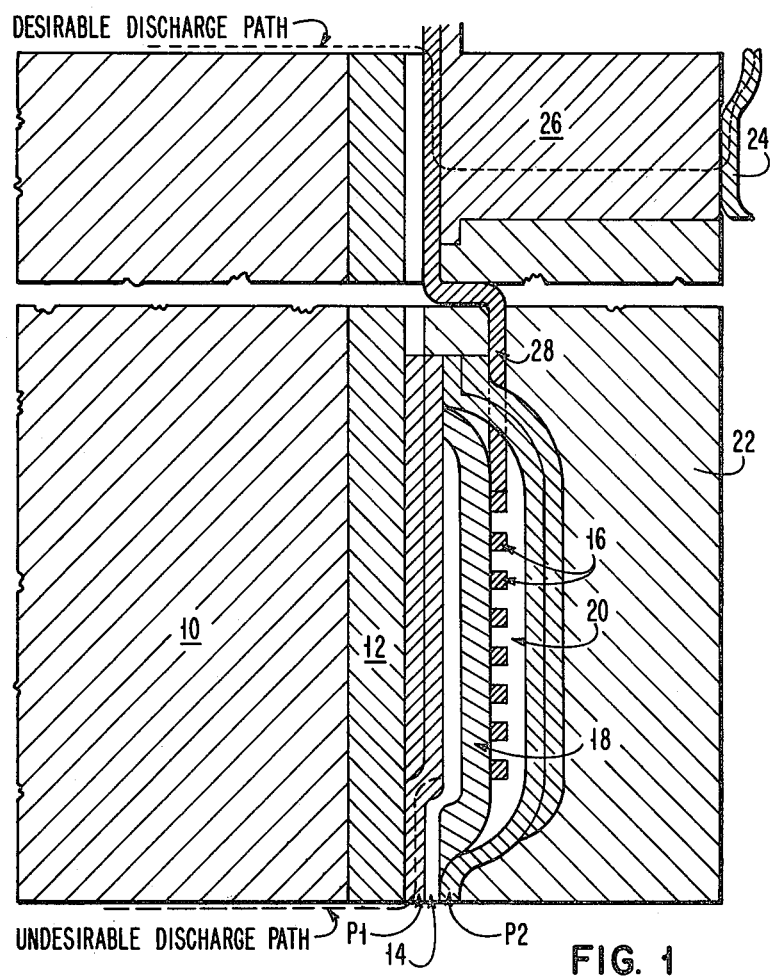
FIG. 1 is a sectional side view of a thin film head deposited on a conductive slider, to exemplify the problem solved by this invention.

With reference to FIG. 1, a magnetic head slider assembly comprises an air bearing slider support 10 on which a thin film transducer is deposited. The slider support 10 is formed from a conductive material, which may be ceramic, and an insulating layer 12 serving as an undercoat is disposed between the first pole piece P1 of the transducer and the air bearing slider 10. A nonmagnetic insulating layer 14 forms a transducing gap between the tips of the pole pieces P1 and P2 of the thin film transducer. To coact with the magnetic circuit formed by the pole pieces P1 and P2, a planar conductive coil 16 of several turns is located between the pole pieces. The electrical coil 16 is encompassed by insulator spacers 18 and 20. To protect the thin film transducer, an insulating overcoat 22 is deposited over the topmost P2 pole piece. The P1 and P2 pole pieces are preferably made from Ni-Fe (Permalloy), which is an electrically conductive material.

The electrical signal, which is provided to the coil 16 and transducer during the write mode, is applied to a conductive wire 24 connected to a stud 26 formed with the transducer. The input signal passes from the stud 26 through a conducting lead 28 that is connected to the coil 16. The same conductive path is employed during the read mode when the magnetic flux representing the recorded signal on a magnetic disk or tape is sensed by the magnetic circuit and transduced to an electrical signal in the coil, which electrical signal is directed from the transducer to a utilization circuit for readout. Static electricity is known to be generated at areas associated with the head assembly. The electrical charges migrate from the areas at which they are generated to build up along conductive paths. Thus in devices of the type depicted in FIG. 1, a buildup of static charge occurs that subsequently results in a discharge from one conductive element across a dielectric, which experiences "breakdown", to another conductive element, in the manner of a capacitive discharge. The discharge usually causes damage by burnout or the like at the areas of the conductive material which act as terminals for the discharge of the stored static electrical energy. It has been found that such damage occurs at the pole tip of the conductive P1 pole piece, which degrades the effectiveness of the head assembly or renders it useless.

Figure 2:
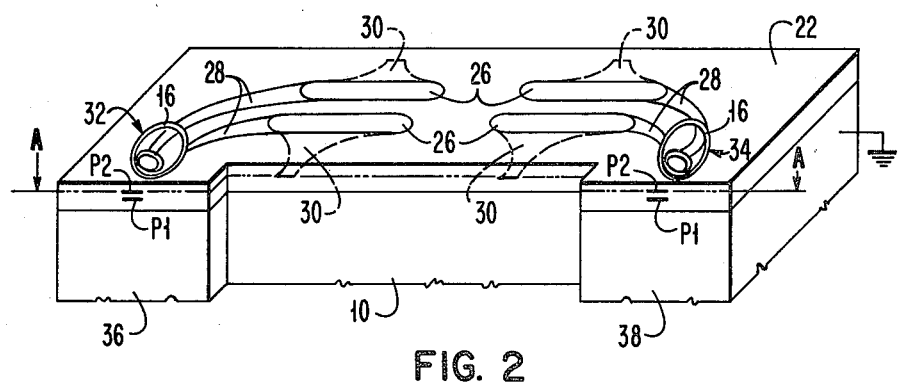
FIG. 2 is an isometric representation, partly cut away, viewed from the bottom of a head slider, depicting the novel structure of this invention.
Figure 3:
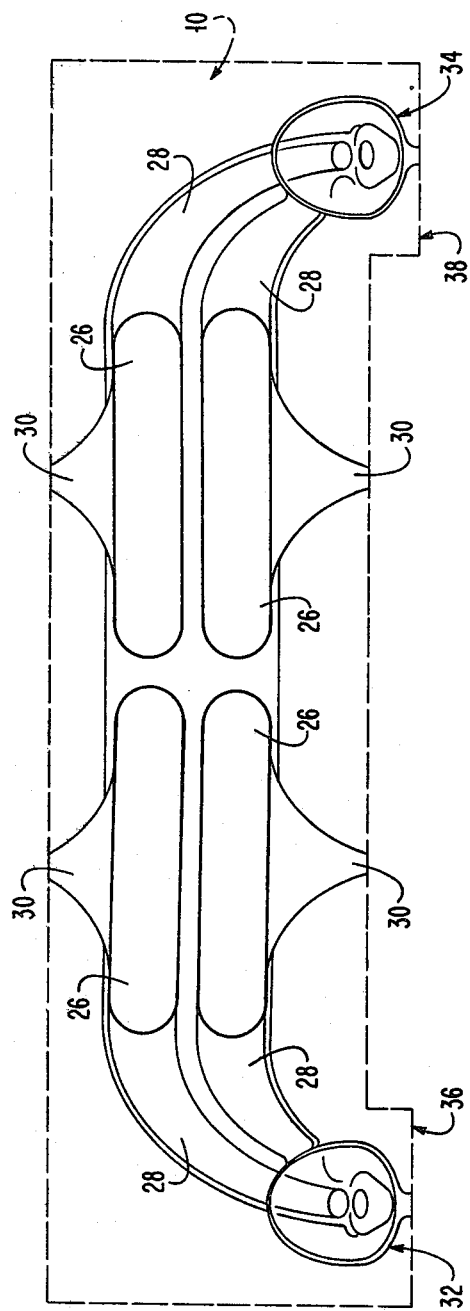
FIG. 3 is a sectional view, taken through line A—A of FIG. 2, of the slider assembly, rotated ninety degrees, to aid in the explanation of the invention.

In accordance with this invention, conductive discharge paths 30 are provided with the head slider assembly, so that static electrical charge bypasses the pole pieces P1 and P2 and transducing gap areas of the thin film transducers 32 and 34, as depicted in FIGS. 2, 3 and 4. The like transducers 32 and 34 are located at the surfaces of air bearing rails 36 and 38 respectively, so that the pole tips of the pole pieces P1 and P2 and the transducing gaps 14 of the transducer are exposed for transducing coaction with a magnetic medium.

The conductive discharge paths 30 are formed by recesses disposed in the overcoat insulating layer 22, and a conductive material such as permalloy, gold or silver, which is deposited within the recesses. The conductive paths 30 are connected to the studs 26 of the transducers 32 and 34, and terminate at the edges of the insulating layer 22 adjacent to the conductive slider support 10. The air bearing head slider assembly is fixed within a disk drive assembly, by way of example, so that the conductive slider support is connected to ground potential. In this way, effective low resistance bleed paths to ground are established.

By virtue of the configuration provided, whenever sufficient static charge is built up in the lead wires 24 of the transducers, or at associated areas of the transducers, a discharge occurs across the gaps formed between the conductive paths 30 and the grounded conductive slider support 10 at the exposed edges of the insulating layer 22. These electrical discharges through the ionized low resistance bleed path are sufficiently displaced from the critical pole piece and gap areas so that no effective damage occurs to the transducers.

By providing the alternate bypass paths of lesser electrical resistance, spurious electrical charges are diverted from the critical areas of the pole tips and gaps, and are dissipated without adversely affecting the magnetic head structure. Costly measures generally employed for preventing discharge damage are avoided, and production yields are increased.

What is claimed is:

1. A magnetic head assembly comprising:
   an electrically conductive air-bearing slider support;
   magnetic transducer means mounted to said slider support;
   means for conducting electrical signals to and from said transducer means;
   an insulating overcoat layer disposed over said magnetic transducer means; and
   conductive paths formed in said insulating overcoat layer for providing low resistance bleed paths that bypass said transducer means so that static electrical charges are discharged at an effective distance from said transducer means.

2. A magnetic head assembly as in claim 1, wherein said conductive slider support is connected to ground potential.

3. A magnetic head assembly as in claim 1, wherein said conductive paths are formed with conductive material disposed in recessed of said overcoat layer.

4. A magnetic head assembly as in claim 1, wherein said slider support comprises air bearing rails at which said transducer means are located.

5. A magnetic head assembly as in claim 1, wherein said transducer means is formed with electrical coil means, and including means for coupling said coil means to said conductive paths.

6. A magnetic head assembly as in claim 1, wherein said conductive paths terminate at ends of said overcoat layer and close to said conductive slider support.

* * * * *